Sept. 21, 1965     H. C. SLECHTA     3,207,836
SELF-SUPPORTING CABLE
Filed Dec. 29, 1961     2 Sheets-Sheet 1
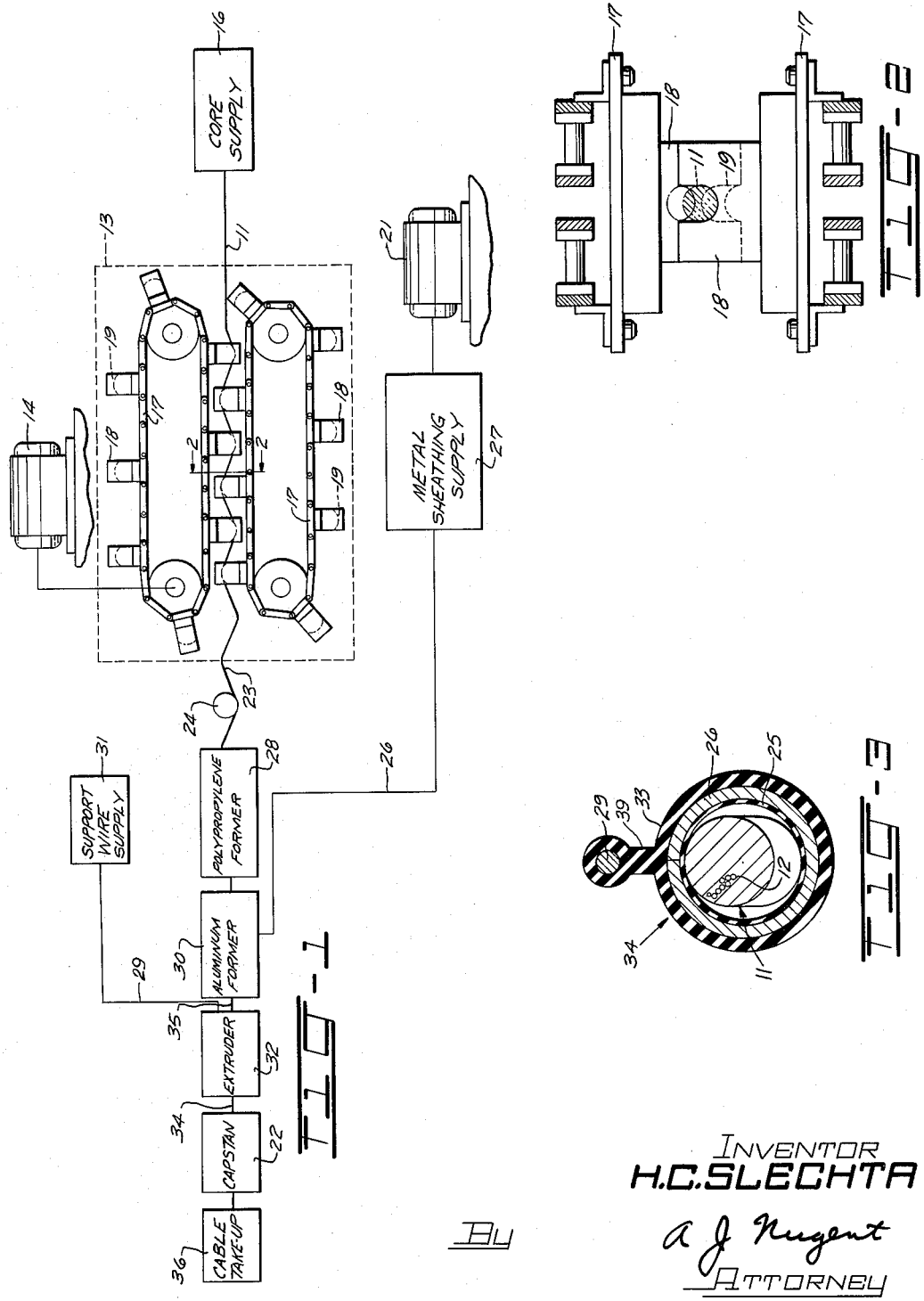
INVENTOR
H.C. SLECHTA
BY A. J. Nugent
ATTORNEY

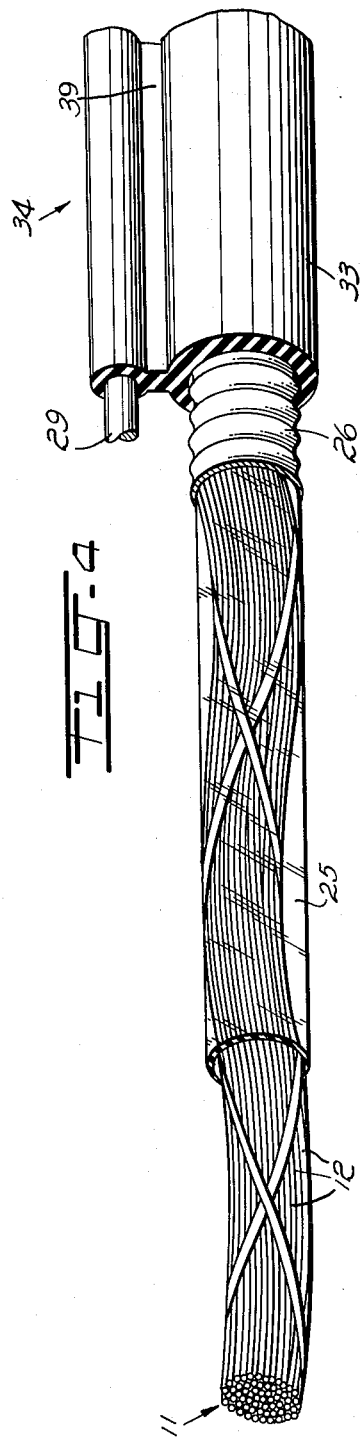
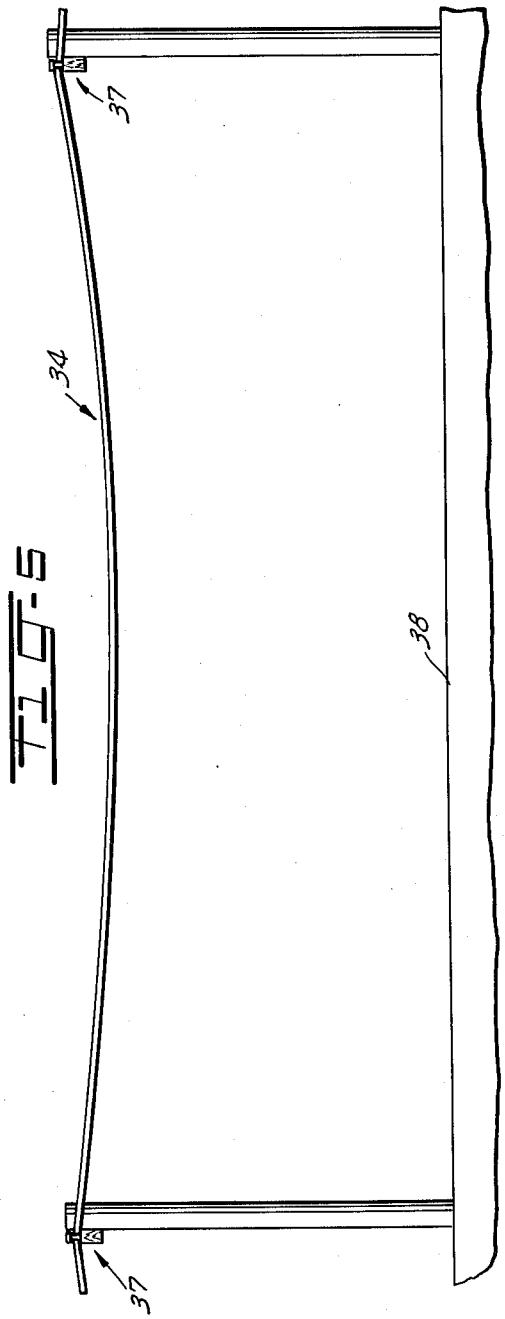

United States Patent Office 3,207,836
Patented Sept. 21, 1965

3,207,836
SELF-SUPPORTING CABLE
Henry C. Slechta, Plainfield, N.J., assignor to Western Electric Company, Incorporated, New York, N.Y., a corporation of New York
Filed Dec. 29, 1961, Ser. No. 163,284
6 Claims. (Cl. 174—41)

This invention relates to the manufacture of cable and particularly to an improved type of self-supporting cable and a method of producing such cable.

A method of stringing cable in the telephone and electric power industries has been to string a support wire between two points and then to lash a multiconductor cable to the support wire. In recent years there has been a trend towards the use of self-supporting cables motivated by reasons of economy and simplicity. The advantages resulting from the installation and handling of self-supporting cable are readily apparent since it is necessary only to manufacture, ship and install a single cable having a common sheathing rather than to ship and install a separate support wire and a separate cable which is attached to the support wire during installation under field conditions.

Among the problems encountered in attempting to produce satisfactory self-supporting cable is the effect of high tensile forces on the conductors. Cable strung between two points is subjected to unusually high tensile forces because of its weight and under such conditions the metal support wire tends to elongate. When this occurs the conductors in the cable are placed under tension, which may possibly create undesirable capacitance effects and presents the possibility of damage to the conductors. If the metal support wire elongates, the tension in most instances is not so severe that the conductors are damaged, but the problem of working with tensioned conductors still exists and makes installation or repair work extremely difficult since a tight core does not permit ready access to the conductor pairs for making terminations.

Formerly, the support or messenger wire was sometimes prestretched to retain a loose core. Unfortunately, however, this solution was not entirely satisfactory because the wire was still subject to elongation upon intallation and the problem of making connections to the conductors still was present. This invention embodies an improved self-supporting cable wherein the disadvantages and limitations of previous cables of this type are avoided.

An object of this invention is to provide an improved type of self-supporting cable.

Another object of this invention is to provide a method of making an improved type of self-supporting cable.

A more specific object of this invention is to provide an improved type of self-supporting cable and the method of making the same wherein a multiconductor cable core is arranged in an undulated path within a sheath and is encased together with a support wire within a protective covering.

In accordance with the general features of this invention, a new type of self-supporting cable embodying the invention comprises a multiconductor cable core set in an undulated form, and a metal support wire, within a common protective covering.

This type of cable may be produced by passing a cable core through a tractor capstan where guiding members alternately spaced on opposing belts at predetermined intervals force the cable core into an undulated form prior to sheathing. The core is first enclosed within a sheath of insulating material and is then surrounded by a metal sheath. A protective covering is extruded over the sheathed core and a metal support wire. The undulations in the core permit the core to stretch within the metal sheath without detrimental effects due to elongation of the support wire.

Other objects and advantages will be apparent from the following detailed description when considered in conjunction with the accompanying drawings, wherein:

FIG. 1 is a schematic plan of the production line illustrating the method in producing the improved type self-supporting cable which is the subject of this application;

FIG. 2 is a cross-sectional view of the capstan forming apparatus;

FIG. 3 is a cross-sectional view of the improved type self-supporting cable in one of its many variations;

FIG. 4 is an isometric view of the cable, a part of which is broken away to show the cable configuration; and FIG. 5 illustrates a typical application of the novel self supporting cable.

In FIG. 1 of the drawings, a cable core 11 having a plurality of conductors 12 which have been twisted into pairs, formed together and bound in a conventional manner, is fed to a means for forming undulations into the core. While the means for forming undulations in the core may be any one of a variety of devices, a tractor capstan 13 with a common type of drive 14 is shown to illustrate a preferred embodiment.

The core 11 is fed from a supply source 16 through the tractor capstan 13 where it passes between opposing belts 17 which carry U-shaped guiding and forming elements 18 alternately spaced on the opposing belts. The open ends 19 of the U-shaped members 18 of the respective belts 17 overlap each other as they engage the core 11 and as a result, the core 11 is forced into an undulated form 23 while being monitored by loop control 24. The undulated core 23 is encased first in a sheath 25 of insulating material such as polypropylene, then in a metal sheath 26 such as corrugated aluminum which is advanced from a supply 27 by any suitable means 21. Former 30 of the general type shown in Patent 2,764,214 to E. W. Reynolds et al., may be employed for the metal sheathing operation.

The inside diameter of the metal shield 26 is controlled during the process so as not to reduce the amplitude of undulations below a desired amount. In applying the metal shield its edges are placed in abutting relationship to obviate compressive effects on the core while realizing appreciable material savings. The sheath 25 of insulating material is applied in overlapped fashion around the core 11 and serves to protect the conductors 12. A metal support wire 29 usually of a heavy guage steel or stranded construction is driven from a supply 31 to a point adjacent the cable core line by the capstan 22. Both the sheathed core 35 and support wire 29 are passed through an extruder 32 where a plastic coating 33 such as polyethylene or polypropylene is extruded over the elements. The completed cable 34 which includes connecting web 39 passes through capstan 22 and is wound on a takeup reel 36.

FIG. 5 shows a typical use of the present novel self-supporting cable wherein the cable is strung above ground 38 between two points such as utility poles 37 in a single stringing operation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The method of producing a self-supporting cable having a core including a plurality of conductors set in a self-retaining undulated form of predetermined amplitude to facilitate making connections to the conductors comprising the steps of advancing the core between U-shaped guiding members alternately spaced on opposed moving belts of a capstan to force the core into an undulatory form, sheathing the undulated core with an insulating material, surrounding the insulated core with a metal sheath, feeding a support wire to a point adjacent and parallel to the sheathed core, and applying an insulated covering over the sheathed core and support wire.

2. A self-supporting cable comprising:
   a cable core including a plurality of conductors set in a self-retaining undulating form over the entire cable length, the undulations providing sufficient tensile relief to facilitate making connections to the conductors when the cable is strung between spaced points,
   an inner sheath of insulating material surrounding the undulated core,
   a metallic sheath surrounding the inner sheath,
   a support wire extending in a straight path adjacent and parallel to the cable core, and
   a plastic sheathing surrounding and interconnecting the sheathed core and support wire.

3. A self-supporting cable according to claim 2 wherein:
   the metallic sheath is formed of a corrugated sheet with the edges in abutting relationship.

4. A self-supporting telephone cable adapted to be strung between spaced points comprising:
   a cable core including a plurality of pairs of individually insulated conductors, the core being set in a self-retaining undulated form, the undulations providing sufficient tensile relief to facilitate making connections to the conductor pairs when the cable is strung between spaced points,
   at least one sheath surrounding the undulated core,
   a support wire adjacent to the core and extending substantially parallel thereto, and
   a protective sheath surrounding and interconnecting the sheathed core and support wire.

5. A self-supporting cable adapted to be strung between spaced points comprising:
   a cable core including a plurality of conductors insulated from each other, the core being set in a self-retaining undulated form, the undulations providing sufficient tensile relief to facilitate making connections to the conductors when the cable is strung between spaced points,
   a support wire extending parallel to the core in proximity thereto, and
   an integral plastic sheath surrounding the core and support wire.

6. A cable according to claim 5 wherein:
   the sheath includes a relatively narrow web portion between the core and the support wire.

References Cited by the Examiner

UNITED STATES PATENTS

| 2,434,793 | 1/48 | Feaster | 174—117 X |
| 2,956,311 | 10/60 | Raydt et al. | 174—41 X |
| 3,033,916 | 5/62 | Scofield | 174—117 |

FOREIGN PATENTS

| 2,449 | 1857 | Great Britain. |

JOHN F. BURNS, *Primary Examiner.*
JOHN P. WILDMAN, *Examiner.*